United States Patent [19]

Rohloff

[11] 4,410,088

[45] Oct. 18, 1983

[54] HOLDERS FOR PHOTOGRAPHIC SLIDES

[76] Inventor: Joachim L. Rohloff, 59 Fourth Beach Clifton, Cape Town, South Africa

[21] Appl. No.: 290,205

[22] Filed: Aug. 5, 1981

[30] Foreign Application Priority Data

Aug. 5, 1980 [ZA] South Africa ................. 80/4745

[51] Int. Cl.³ .................. B65D 85/30; B65D 85/62
[52] U.S. Cl. ........................... 206/455; 229/1.5 R; 206/44 B
[58] Field of Search ............ 206/455, 456, 454, 45.11, 206/44 B, 425; 229/1.5 R, 15, 69

[56] References Cited

U.S. PATENT DOCUMENTS 897,608  9/1908  Ely ........................................ 229/15

Primary Examiner—William T. Dixson, Jr.

Attorney, Agent, or Firm—Irons & Sears

[57] ABSTRACT

A holder (10) for photographic slides which is normally in a rectilinear condition in which it can be contained in a box. The holder includes a flexible element (12) which has connecting portions (18, 20) at each end thereof. A tongue (28) associated with the portion (18) co-operates with a tongue associated with the portion (20) and the portion (18) co-operates with a flange (34) to secure the holder into the form of a closed loop. A unit (14) is attached to the element (12) and to the portions (18, 20) and forms a series of pockets (54) each of which serves to receive a photographic slide. From the holder (10) the slides are transferred directly to the pockets of a slide magazine for projection. The holder (10), when straight, occupies less space that a rotary projector magazine and is far less expensive to produce.

8 Claims, 10 Drawing Figures

HOLDERS FOR PHOTOGRAPHIC SLIDES

This invention relates to holders for photographic slides.

According to the present invention there is provided a holder for photographic slides which comprises a strip-like flexible element, a connecting portion at each end of the flexible element, the connecting portions including means for releasably securing them one to the other thereby to retain the holder in the form of a closed loop once the connecting portions have been brought into juxtaposition, and a rectilinear array of side-by-side pockets, the array extending between said connecting portions and being adjacent said element, each pocket serving to receive a photographic slide, and the rectilinear array becoming a radial array once said holder has been formed into a closed loop.

In a preferred form said array of pockets comprises a strip of material folded to provide a composite panels each including first and second panels joined to one another along a score line and secured in back-to-back relationship, zones narrower than said composite panels, there being a zone between each pair of adjacent composite panels and each zone being joined to the adjacent composite panels by way of score lines, said zones forming end walls of pockets the side walls of which are constituted by the composite panels, and the base and other end wall of each pocket being constituted by flexible cords which extend longitudinally of the array adjacent the lower edges of the composite panels and adjacent the first mentioned score lines.

The cords can be seated in notches provided in the edges of the composite panels.

To provide for simple inter-connection of the connecting portions, each may include a tongue, one of said tongues having a slit therein through which the other tongue can pass.

Preferably said flexible element and said connecting portions are integral with one another with said connecting portions hingedly connected to the ends of the flexible element. More specifically, said flexible element and said connecting portions can be an injection moulding there being a film hinge between each connecting portion and said flexible element. Camming portions can stand proud of that face of the element which is radially innermost when the element is in the form of a loop, the camming portions bearing on one another when the element is in the form of a loop to urge the element towards a circular configuration.

To assist in interlocking the connecting portions one can have a deformable flange along that edge thereof which is remote from the tongue that protrudes from that portion, the other of said connecting portions deflecting said flange as the portions are brought into face-to-face relationship whereby the flange snaps over said other portion to hold the portions together.

In a preferred form said strip-like element has a plurality of ribs extending transversely thereto, the ribs being narrower than said zones and said zones being adhered to the ribs and extending beyond the ribs in each direction to overlie the inter-rib spaces. Adjacent said score lines between said zones and said panel, said panels are preferably not adhered to one another whereby, on flexing of said element between its rectilinear and curved positions, said regions of the panels are free to move towards and away from one another.

For a better understanding of the present invention, and to show how the same may be carried into effect, reference will now be made, by way of example, to the accompanying drawings, in which.

Figure 1:
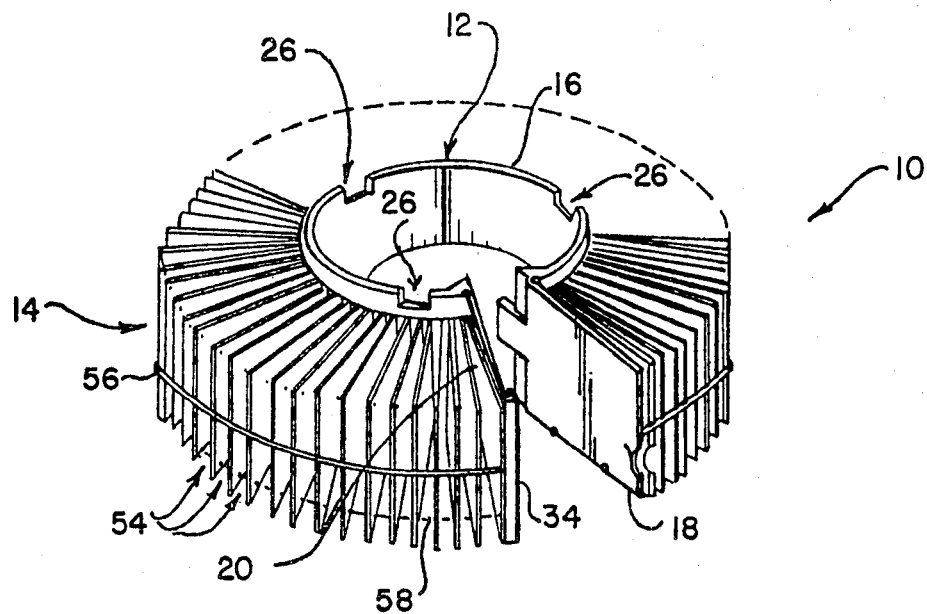
FIG. 1 is a pictorial view of a holder for photographic slides.
Figure 2:
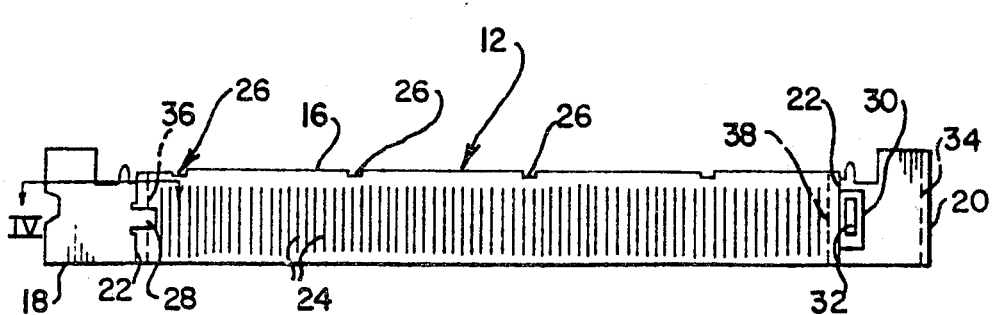
FIG. 2 is an elevation of a belt forming part of the holder of FIG. 1.
Figure 3:
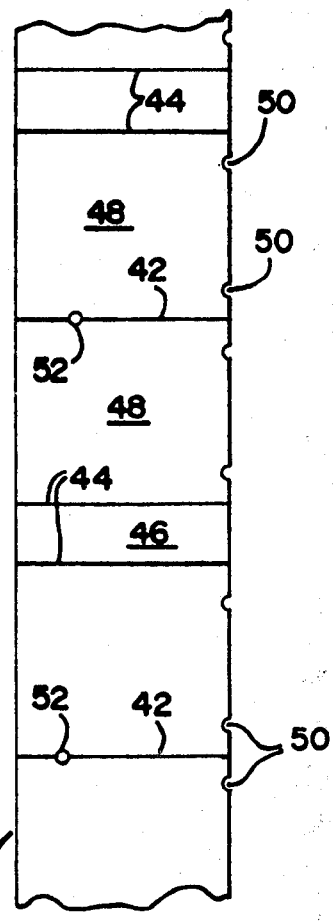
FIG. 3 illustrates a strip of cardboard.

The photographic slide holder 10 shown in FIGS. 1 to 5 comprises a rectangular, elongate belt 12 (FIG. 2) and a unit 14. The belt 12 is preferably of injection moulded synthetic plastics material and the unit 14 is preferably of folded cardboard.

The belt 12 has an elongate, rectangular central part or flexible element 16 and two end portions 18, 20 joined to the ends of the part 16 by way of film hinges 22. A plurality of raised parallel ribs 24 extend transversely across the part 16 and there are three rectangular notches 26 along one of its longer edges.

The end portion 18 includes a tongue 28 which protrudes into the part 16 beyond the adjacent film hinge 22. Gaps between the tongue 28 and the part 16 ensure that, when the belt 12 is flexed, the tongue 28 can move freely with respect to the part 16.

The end portion 20 includes a tongue 30 which is bounded along one of its edges by the adjacent film hinge 22, there being a slit 32 in the tongue 30. The gaps between the tongue 30 and the portion 20 permit the tongue 32 to move freely about that edge thereof which is bounded by the hinge 22.

A latching flange 34 extends along the edge of the portion 20 which is remote from the hinge 22.

Two camming elements 36 and 38 (see particularly FIG. 5) protrude from the part 16, the camming elements extending across the belt 12 and being interrupted in the regions of the tongues 28 and 30.

The unit 14 is fabricated from a strip 40 of cardboard (FIG. 3) which is transversely scored at intervals throughout its length. The strip 40 is alternately provided with a score line 42, then two adjacent score lines 44, then a score line 42 etc throughout its length. Between the pairs of score lines 44 there are narrow panels 46 and between each line 42 and the adjacent line 44 there is a wider panel 48. Each panel 48 is formed with two notches 50 in one free edge thereof and there are holes 52 on the score lines 42.

Figure 4:
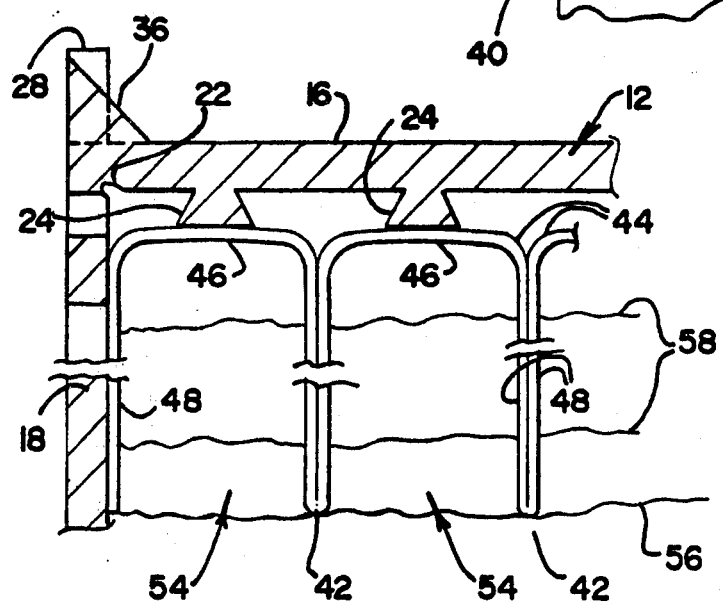
FIG. 4 is a section, to a larger scale, and on the line IV—IV of FIG. 1.
Figure 5:
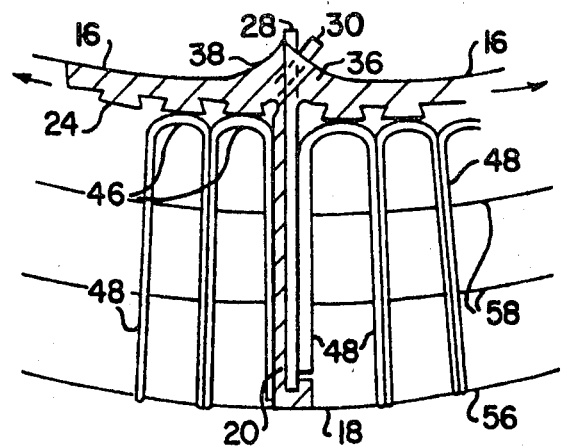
FIG. 5 is a plan view of the two end parts of the holder of FIG. 1, the parts being interconnected to form a complete loop.

The strip 40 is folded as best shown in FIG. 4. Folding the strip 40 along the score lines 42 brings adjacent panels 48 into back-to-back relationship, juxtaposed panels 48 being adhered together in this position. The surface parts of the panels 48 adjacent the zones 46 are not adhered together, this permitting them to diverge as shown in FIG. 4. Each zone 46, when the strip 40 is folded along the lines 44, becomes an end wall of one of the pockets 54 which are thus provided. While curves of small radius are shown where the zones 46 and panels 48 meet, there would in practice be far sharper junctions due to the scoring.

The end panels 48 of the strip 40 are adhered to the end portions 18 and 20 which project at right angles to the part 16. A cord 56 is inserted in the notches which the holes 52 because when the strip 40 is folded along the lines 52. The cord 56 is inserted into the notches, and adhered in place, while the belt 12 is held in the form of a loop (as will be described) so that it is taut in this condition. Once the holder is allowed to return to its rectilinear condition, the cord 56 goes limp. Similarly, two cords 58 are inserted into the notches 50. The cord 56 constitutes an outer side wall of the unit 14 and the cords 58 form the base of the unit.

The narrow panels 46 are adhered to the outer faces of the ribs 24. It will be seen from FIG. 4 that the ribs 24 are narrower then the panels 46 so that the panels 46 protrude beyond each rib over the inter-rib spaces.

The slide holder 10 is normally stored in a rectilinear condition in a box with a photographic slide in each pocket 54. The slides are supported by the cords 58 and prevented from moving laterally by the cord 56 and the panels 46. When the slides are to be projected, the holder 10 is removed from its box and curved with the belt 12 on the inside. As the holder is progressively curved, the portions 18 and 20 approach one another until the camming portions 36 and 38 engage. These bear on one another and have the effect of urging the belt 12, which naturally tends to take up an oval shape, towards the requisite round shape.

Because the portion 18 is at right angles to the part 16, the tongue 28 protrudes inwardly from the hinge 22. The tongue 30, by bending it about the adjacent film hinge 22, can be brought to a position at an angle to the end portion 20. Consequently, it is possible to bring the tongues into co-operating relationship so that the tongue 28 passes through the slit 32 in the tongue 30. As this happens, the free vertical edge of the portion 18 is pressed against the locking flange 34 of the portion 20. The portion 18 resiliently deflects the flange 34 so that the portion 18 can move into the channel defined between the flange 34 and the remainder of the portion 20. Thereafter, the flange 34 snaps back and prevents separation of the two portions 18 and 20.

The slides are then transferred from the holder 10 to a slide magazine of the type which rotates stepwise as the slides are projected. This is achieved by placing the slide magazine upside down over the holder 10, the notches 26 being used to locate the magazine with respect to the holder. Once this has been done, the holder and magazine are inverted so that the slides drop into the compartments of the magazine. They can then be projected and, when it is desired to store them again, they are returned to the pockets 54 by reversing the described procedure. Subsequently, the tongue 30 is removed from the slit 32, the belt 12 straightened and the now rectilinear holder 10 returned to its storage box.

Figure 6A:
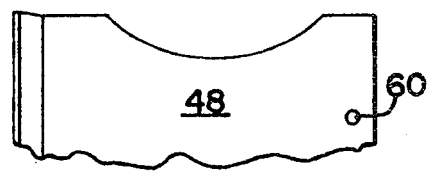
FIGS. 6a, 6b, 6c and 6d illustrate different panel configurations.
Figure 6C:
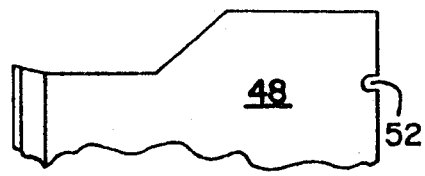
Figure 6B:
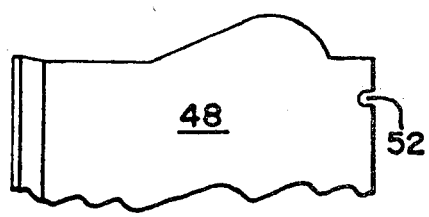
Figure 6D:
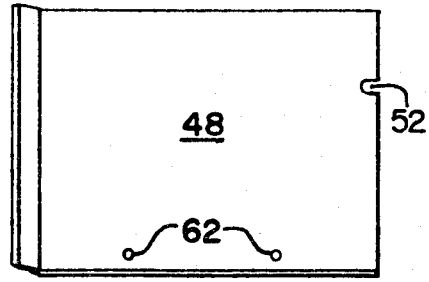

The upper edge of each panel 48, and the upper edge of each portion 18, 20, can be shaped as shown in any one of FIGS. 6a, 6b, 6c and 6d. These configurations suit commercially available magazines of the rotary type and enable the magazines to fit snugly over the holder illustrated. In FIG. 6a the hole 52 is replaced by a hole 60 located just off the crease line 42. In FIG. 6d the notches 50 are replaced by holes 62 located slightly above the lower edge of the panel. When these modifications are employed, the end portions 18 and 20 must be altered in conformity. The columns 68 of the portions 18 and 20 serve to locate the holder 10 circumferentially with respect to slide magazine.

Figure 7:
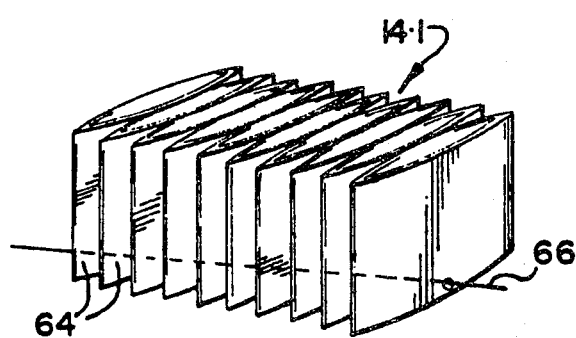
FIG. 7 illustrates a further pocket construction.

In FIG. 7, individual pocket forming structures 64 are adhered together to form the unit 14.1. In this form one or more cords 66 form the base of the unit, and the unit is thereafter secured to the belt 12.

I claim:

1. A holder for photographic slides which comprises a strip-like resiliently flexible belt which forms one side wall of the holder, a connecting portion at each end of the flexible belt, the connecting portions including means for releasably securing them one to the other thereby to retain the holder in the form of a closed loop once the connecting portions have been brought into juxtaposition, a plurality of spaced panel elements protruding from one side of said flexible belt, the panel elements defining an array of upwardly open side-by-side pockets, the array extending between said connecting portions and being adjacent said belt, each pocket serving to receive a photographic slide which slide can be inserted downwardly into the pocket through the upwardly open mouth thereof, first flexible means extending along the length of said array, the first flexible means being secured to the panel elements, forming a further side wall of the holder which further side wall is opposed to said one side wall and preventing photographic slides leaving said pockets in the direction away from said belt, and second flexible means extending along the length of said array, joined to the panel elements and forming the bases of the pockets on which bases photographic slides inserted into the pockets through their upwardly open mouths are supported, the rectilinear array becoming a radial array once said holder has been formed into a closed loop and the first and second flexible means being taut while the holder is in the form of a closed loop and limp while the holder is in its rectilinear condition.

2. A holder according to claim 1, in which each of said connecting portions is in the form of a panel, one edge of each panel being joined to said belt and the panels being formed with first and second inter-engaging means, the first inter-engaging means being at the inner periphery of the holder when it is formed into a loop and the second inter-engaging means being at the outer periphery of the holder when it is formed into a loop whereby said panels are connected to one another at an inner radial location and at an outer radial location.

3. A holder according to claim 2, in which each of said panels includes a tongue, one of said tongues having a slit therein through which the other tongue can pass, the tongues together constituting said first inter-engaging means.

4. A holder according to claim 2, in which said flexible belt and said panels are integral with one another with the panels hingedly connected to the ends of the flexible belt.

5. A holder according to claim 4, in which said flexible belt and said panels are injection moulded, there being a film hinge between each panel and said flexible belt.

6. A holder according to claim 3 in which one of said panels has a deformable flange along that edge thereof which is remote from the tongue that protrudes from that panel, an edge zone of the other of said panels deflecting said flange as the panels are brought into face-to-face relationship whereby the flange snaps over said edge zone to hold the connecting portions together, said flange and said edge zone constituting the second inter-engaging means.

7. A holder according to claim 1 or 2, in which said flexible belt is wider than said panel elements and in which an upper edge zone of the belt lies above those edges of the panel elements which bound the open mouths of the pockets, there being upwardly open notches formed in said edge zone of the belt.

8. A holder according to claim 1 or 2, in which said flexible belt includes a plurality of transversely extending ribs on that face thereof which is the radially outer face when the holder is formed into a closed loop.

* * * * *

UNITED STATES PATENT AND TRADEMARK OFFICE
CERTIFICATE OF CORRECTION

PATENT NO. : 4,410,088

DATED : 10/18/83

INVENTOR(S) : Joachim L. Rohloff

It is certified that error appears in the above-identified patent and that said Letters Patent is hereby corrected as shown below:

Column 3, line 5, for "52" read --42--.

Signed and Sealed this

Fourteenth Day of February 1984

[SEAL]

Attest:

GERALD J. MOSSINGHOFF

*Attesting Officer*  *Commissioner of Patents and Trademarks*